No. 693,734. Patented Feb. 18, 1902.
G. A. NAUFFTS.
AUTOMATIC OIL FEED CUP.
(Application filed Dec. 26, 1900.)
(No Model.)
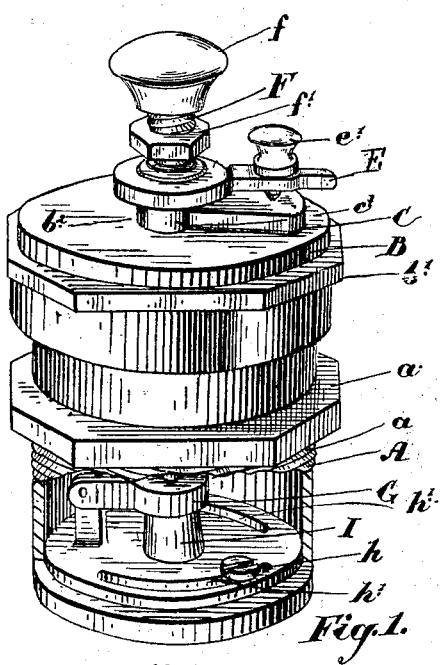
Fig. 1.
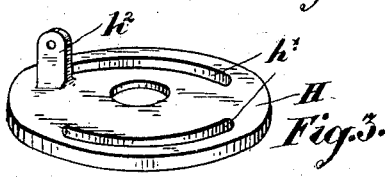
Fig. 3.
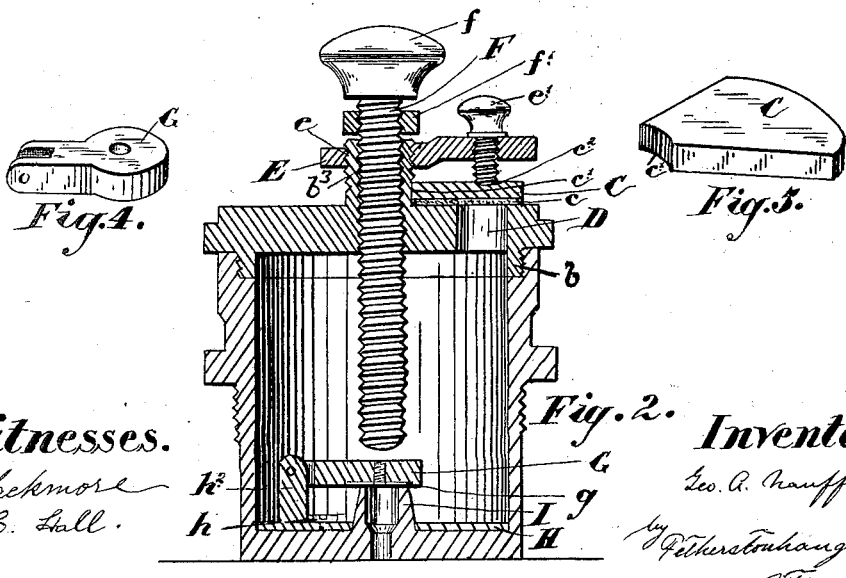
Witnesses.
L. Blackmore
F. C. Hall
Inventor.
Geo. A. Nauffts
by Fetherstonhaugh & Co
Attys ized in the following of the bearings or portion of the engine neces-

UNITED STATES PATENT OFFICE.

GEORGE ARTHUR NAUFFTS, OF HALIFAX, CANADA.

AUTOMATIC OIL-FEED CUP.

SPECIFICATION forming part of Letters Patent No. 693,734, dated February 18, 1902.

Application filed December 26, 1900. Serial No. 41,074. (No model.)

*To all whom it may concern:*

Be it known that I, GEORGE ARTHUR NAUFFTS, a subject of the Queen of Great Britain, residing at Halifax, in the county of Halifax, in the Province of Nova Scotia, Canada, have invented certain new and useful Improvements in Automatic Oil-Feed Cups, of which the following is a specification.

My invention relates to improvements in automatic oil-feed cups; and the object of the invention is to design an oil-cup with an automatic valve, which shall be sufficiently sensitive to oil the bearings in an engine, whether stationary or otherwise, from the vibration incidental in the working of any machinery, and also have the parts so arranged as to greatly facilitate the cleaning and general repairing of the device; and it consists, essentially, of a cylindrical cup threaded on the outside, having its orifice for filling to one side of the center of the cover, which is closed by an arm swinging on a central projection from the cover, such arm being guided and held in place by a second arm with a threaded orifice at its inner end to turn on the aforesaid central projection, and an adjustable disk at the bottom of the cup surrounding a raised valve-seat on which rests a valve pivotally swung from an upright projection on the disk, the said valve having its upward movement regulated by a threaded pintle projecting down into the cup through an orifice in the cover, the various parts being constructed in detail as hereinafter more particularly described.

Figure 1 is a perspective view of my oil-cup partially broken away to show the arrangement of my valve at the bottom thereof. Fig. 2 is a sectional view of my oil-cup. Fig. 3 is a detail of the adjustable disk at the bottom of the cup. Fig. 4 is a detail of the valve. Fig. 5 is a detail of my device for closing the orifice in the cover.

Like letters of reference indicate corresponding parts in each figure.

A is the cup, which is circumferentially threaded at $a$ and provided with angular surrounding rims $a'$ for the purpose of screwing into the oil-cup receptacle.

B is the cover of the oil-cup A and has a threaded rim $b$ projecting from its under side and by means of the angular surrounding rim $b'$ screwed into the cup A. The cover B has a small and circular projection $b^2$ from its center, which is threaded at its upper end and provided with a threaded orifice $b^3$ through its middle.

The plate C, designed to close the orifice D in the cover B, is provided on its under side with a leather or other suitable facing $c$ and at its inner end with an arc-shaped recess $c'$, which is designed to fit around the lower portion of the projection $b^2$ and freely swing thereon. The arm E is placed immediately over the arm C, having at its inner end a threaded orifice $e$, which is intended to screw on the upper and threaded portion of the projection $b^2$, and toward the outer end of the arm E the set-screw $e'$ is designed to hold the said arm E immediately over the arm C and and at the same time force the facing $c$ of the arm C firmly against the surface surrounding the orifice D to prevent the egress of oil from the cup. It will be seen that on turning or unscrewing the arm E the arm C will also move and at the same time relieve the pressure of the leather facing $c$ from the surface, as the loosening in the act of unscrewing allows the arm C to swing to one side with the arm E. The set-screw $e'$ is preferably screwed into an indentation $c^2$ in the upper side of the arm C.

The spindle F is threaded its entire length and is surmounted by a suitable knob $f$. Immediately underneath the knob $f$ is a lock-nut $f'$. The spindle F is screwed into the orifice $b^3$, and when screwed in to its entire length its lower end nearly, but not quite, reaches the valve G.

The disk H surrounds the raised valve-seat I and is attached to the bottom of the cup by means of the screws $h$ and can be adjusted circumferentially by means of the slots $h'$, as the heads of the screws are intended to abut the edges of the slots at any point which may be desired. The disk H has an upright projection $h^2$ from its surface.

The valve G is faced where it rests on the valve-seat I with a leather or other suitable facing $g$, and at its inner end the said valve G is pivotally swung on a projection $h^2$.

In order to put my device to use, I screw the cup firmly into an oil-cup receptacle above the bearings or portion of the engine necessary to be lubricated and after filling the cup with oil through the orifice D, which has been opened by unscrewing the arm E, I screw up the arm E, thus firmly closing the orifice D. Before the operation of filling the cup I adjust the disk H, placing the valve in such a position that it will receive the benefit of the vibration necessary to its working. The spindle F is now turned so that its lower end is at the requisite distance from the upper side of the valve G, and then held in place by the lock-nut $f'$. The upward movement allowed to the valve G must be judged entirely by circumstances. The slightest vibration will now cause the valve G to jump on its seat, and during the motion of the engine there will be a constant and steady dripping of oil from the cup onto the bearings. The raised valve-seat prevents any sediment from dripping through as it is deposited on the disk H, which can readily be removed and replaced at any time. In fact, my device can be taken to pieces, cleaned, and repaired at ease.

It must be understood that while I here describe a cylindrical cup as being the most common form in use my device will apply equally well to any shape or form of oil-cup.

What I claim as my invention is—

1. The combination with an oil-cup having a cap with an axially-projecting sleeve having a threaded portion and an opening through the cap to one side of the center thereof, of a plate having a bearing on said sleeve adapted to cover said opening, an arm threaded on the sleeve above said plate and an adjustable device interposed between the arm and plate, substantially as described.

2. In an oil-cup the combination with the cup portion thereof, of a circular upright projection from the lid circumferentially threaded toward its upper end, and having a central threaded orifice leading into the cup, and a stopple suitably faced on its under side, and swinging laterally from the said upright projection, an arm with a threaded orifice at its inner end designed to turn on the upper portion of the aforesaid projection, a set-screw extending through the outer end of the arm and reaching to the lower arm, as and for the purpose specified.

3. In an oil-cup, the combination with the cup portion thereof, of a disk surrounding a raised valve-seat, and provided with concentric slots, an upright projection from said disk having a valve pivotally swung, and having its under side suitably faced where it rests on the valve-seat, and means for regulating the movement of the valve, as and for the purpose specified.

4. In combination with an oil-cup having a cap with an axially-projecting sleeve having a threaded portion and an opening through the cap to one side of the center thereof, a closure adapted to cover said opening, an arm threaded on the sleeve and a set-screw passing through the arm and having adjustable engagement with the closure, for holding the latter on said opening.

Signed at Halifax this 20th day of December, 1900.

GEORGE ARTHUR NAUFFTS.

Witnesses:
FREDERICK FRANCIS MATHERS,
ARTHUR WILLIAM REDAN.